United States Patent [19]

Barner

[11] Patent Number: 5,706,717
[45] Date of Patent: Jan. 13, 1998

[54] HEATING CONTROL SYSTEM FOR A GAS FRYER

[75] Inventor: Robert Barner, San Antonio, Tex.

[73] Assignee: America's Favorite Chicken Co., Atlanta, Ga.

[21] Appl. No.: 747,597

[22] Filed: Nov. 12, 1996

[51] Int. Cl.⁶ .............................. A47J 37/00; A47J 37/12
[52] U.S. Cl. ..................... 99/330; 99/337; 99/403; 126/378; 126/391; 219/492; 219/497; 426/233; 426/438
[58] Field of Search ............... 99/403, 325–334, 99/337, 338, 404–410; 126/378, 92 AC, 92 R, 390–392, 357, 360 R; 210/167, DIG. 8; 219/492, 497, 506, 508, 442, 483, 486, 510, 512; 340/589; 426/233, 438, 519, 808, 302, 305, 231; 431/326, 170

[56] References Cited

U.S. PATENT DOCUMENTS

| | | |
|---|---|---|
| 3,877,359 | 4/1975 | Keating . |
| 4,086,643 | 4/1978 | Jacobs . |
| 4,197,581 | 4/1980 | Watrous et al. . |
| 4,210,123 | 7/1980 | Moore et al. . |
| 4,324,173 | 4/1982 | Moore et al. . |
| 4,372,980 | 2/1983 | Luebke et al. ........................ 426/231 |
| 4,502,373 | 3/1985 | Keating . |
| 4,639,213 | 1/1987 | Simpson ................................ 431/326 |
| 4,684,412 | 8/1987 | Fritzsche ............................... 99/330 X |
| 4,785,725 | 11/1988 | Tate et al. . |
| 4,913,038 | 4/1990 | Burkett et al. . |
| 4,923,705 | 5/1990 | Mottur et al. ........................ 426/438 |
| 5,060,559 | 10/1991 | Winter . |
| 5,185,168 | 2/1993 | Takahashi ............................ 426/233 |
| 5,235,159 | 8/1993 | Kornrumpf et al. ................. 219/486 |
| 5,352,866 | 10/1994 | Cartwright et al. . |
| 5,398,597 | 3/1995 | Jones et al. . |
| 5,490,449 | 2/1996 | Meister et al. ....................... 99/403 X |
| 5,575,449 | 11/1996 | Maher, Jr. et al. ................. 219/497 X |
| 5,582,755 | 12/1996 | Maher, Jr. et al. ................. 219/492 |

Primary Examiner—Timothy F. Simone
Attorney, Agent, or Firm—Banner & Witcoff, Ltd.

[57] ABSTRACT

The present invention provides a fryer system including a fryer having a vat for containing shortening therein, a heat exchanger disposed within the vat, a heating mechanism for supplying heat to the heat exchanger, and a control mechanism for controlling the heating mechanism. The control means repeatedly cycles the heating mechanism between an off condition and an on condition during a melt mode of operation and maintains the heating mechanism in an on condition during a cook mode of operation. A manual switch is provided for switching the control mechanism from the melt mode of operation to the cook mode of operation. A prevention mechanism is also provided for preventing the control means from entering the cook mode of operation, and thereby maintaining the heating mechanism in an on condition, prior to actuation of the manual switch.

12 Claims, 14 Drawing Sheets

NOTE: POWER INTERRUPT AND RESTORATION RETURNS PROCESS TO START

HEATING CONTROL SYSTEM FOR A GAS FRYER

TECHNICAL FIELD

The present invention relates to a deep fat gas fryer, and more particularly, to a deep fat gas fryer having a "safe-melt" mode for melting solid shortening, a power-off fail safe, and a "safe-filtering" mode that, separately or in combination, assist in preventing the heat exchanger and fryer components from overheating.

BACKGROUND OF THE INVENTION

Deep fat fryers, or gas fryers, are commercially used by restaurants, institutional kitchens, and fast food establishments for cooking a variety of food products, such as french fries, fish, fried chicken, and the like. The gas fryer must not only accommodate the individual heating requirements of each particular food product, but it must also maintain consistency and uniformity of taste and texture during the cooking process. The food product is cooked by totally immersing it within a vat or tank that is filled with heated oil or shortening. The oil is typically heated using a heat exchanger having a recirculating flow of heated gas that is forced or drawn through flow passages or tubes that are in thermal communication with wall portions of the cooking vat. A gas burner is provided to heat the gas circulating within the heat exchanger. In U.S. Pat. No. 5,417,202, assigned to America's Favorite Chicken Company (AFC), the heat exchanger utilizes a combination of inclining, declining, and horizontal heat transfer tubes and mixing plenums connected thereto in order to ensure that there is a thorough mixing of the heat transfer fluid passing through the heat transfer tubes. This is further accomplished by positioning the heat exchanger, including both the heat transfer tubes and the mixing plenums, within the tank or vat that is filled with the shortening or other cooking medium. Examples of other prior art systems are shown in U.S. Pat. Nos. 4,481,873 to Keating; 4,848,317 to Prudhomme et al.; 4,898,151 to Luebke et al. and 5,050,582 to Almond et al.

In these prior art systems, it is difficult to safely melt solid shortening or congealed shortening because the heat exchanger within the fryer vat will overheat unless it is fully surrounded by a liquid, i.e., melted shortening. When the solid shortening melts around the heat exchanger tubes and leaves a hollow cavity of air, it allows the temperature of the tubes to become excessive. Thus, without the melted shortening acting as a conductive medium around the tubes of the heat exchanger, the tubes quickly reach an excessively high temperature that may cause permanent damage thereto, as well as damage to the fryer vat, such as weld cracking where the heat exchanger joins the vat. If shortening leaks out through the damaged weld it may fall to where it would be exposed to flame from the burner and a fire could result. In addition, partially exposed heat exchanger tubes that are overheated may heat the shortening surface past the flash point thereof and cause a fire in the vat.

Resolving this problem is further compounded by the dangers involved with first melting solid shortening at a different location away from the vat and then attempting to pour the hot shortening into the fryer vat. Due to the inherent danger of employees being severely burned, this resolution of the problem is generally not followed in the industry. Other attempts to resolve this problem include prior gas fryers having a designated melt cycle that turns heat on and off in a repeated cycle, i.e. a duty cycle, until the shortening reaches a predetermined temperature as sensed by a sensor, and then automatically applies full power to the fryer. While this type of melt cycle may assist in preventing scorching of the shortening and extending the shortening life by more slowly warming the shortening, it does not prevent the premature operation of the fryer in a full heat cook mode. Further, because other considerations dictate that the sensor be located below the top of the heat exchanger, the shortening reaching a predetermined temperature at the location of the sensor does not guarantee that a sufficient quantity of shortening has melted so as to enable the fryer vat to withstand the heat of full power. In such instances when the solid shortening has not sufficiently melted to substantially submerge the heat exchanger, the automatic application of full power results in an overheating of the fryer vat and, very likely, destroys the same.

Overheating of the heat exchanger also creates a problem during certain operations of the fryer vat. For example, when the melted shortening is drained from the flyer vat for periodic filtering, it is important that the power to the heat exchanger be turned off, and that power is not restored until after the melted shortening has again filled the vat. In practice, however, the drain valve inadvertently may not be closed in the vat after the filtering operation and the melted shortening empties through the drain hole rather than refilling vat. Thus, when power is restored to the heat exchanger, the vat is empty and it overheats. This type of problem is further compounded by prior art fryers that resume operation in their last mode of operation prior to power being interrupted. For example, if a fryer was operated in a full heat cook mode when the power was turned off or otherwise interrupted, when the power was restored the flyer would begin operation in the full heat cook mode. In the interim, however, while the power was interrupted, the shortening may have been drained from the flyer vat or, depending upon the time of the power outage, the shortening may have resolidified within the vat. In either case, the initial application of full heat will cause the heat exchanger to overheat and damage the vat.

SUMMARY OF THE INVENTION

Accordingly, in view of the foregoing, it is an object of the present invention to provide a gas flyer having a "safe-melt" mode which significantly reduces the potential for damage to the flyer vat and/or a fire igniting due to overheating of the heat exchanger, and which eliminates the problems and disadvantages occurring in the prior art as discussed above It is a further object of the present invention to provide a power-off fail safe for the gas flyer to ensure that the flyer begins operation in the safe-melt mode whenever power is initially supplied after being turned off or otherwise disrupted.

It is also an object of the present invention to provide a gas flyer having a "safe-filtering" process that reduces the potential for damage to the flyer vat after the filtering process due to lack of shortening in the vat and that also eliminates the problems and disadvantages found in the prior art.

These objects are achieved by the fryer system of the present invention having a fryer including a vat for containing shortening therein, a heat exchanger disposed within the vat, a heating mechanism for supplying heat to the heat exchanger, and a control mechanism for controlling the heating mechanism. The control mechanism repeatedly cycles the heating mechanism between an off condition and an on condition during a melt mode of operation and maintains the heating mechanism in an on condition during a cook mode of operation. A manual switch is provided for switching the control mechanism from the melt mode of operation to the cook mode of operation. The control mechanism is prevented from entering the cook mode of operation, and thereby maintaining the heating mechanism in an on condition, prior to actuation of the manual switch. The fryer vat contains a selected amount of shortening such that the shortening within the vat in a substantially melted state is at least sufficient to substantially cover the heat exchanger and thereby define a safe level of shortening. The manual switch is actuated after the shortening has melted sufficiently to reach the safe level. The control mechanism is also required to operate in the melt mode whenever power is initially supplied thereto following a power interruption. In a preferred embodiment of the present invention, the control mechanism further includes a sensor for sensing the temperature of the melted shortening within the vat and creating a signal when the temperature sensed reaches a predefined value that differentiates between room temperature and that of the melted shortening. The manual switch may only be actuated after the sensor reaches the predefined value.

In a further preferred embodiment of the present invention a power switch having an on position and an off position is provided for turning power on and off, respectively, to the control mechanism. A drain switch is also provided for applying power to the control mechanism when the drain switch is closed and interrupting power to the control mechanism when the drain switch is open. The drain switch is closed when a drain valve of the vat is closed and open when the drain valve of the vat is open. Thus, the drain switch thereby ensures that the drain valve of the vat is closed before applying power to the control mechanism. This in turn ensures that the controller will return to the default safe melt mode after the drain is opened. A return switch is further provided for applying power to a filter and return system when the return switch is closed and interrupting power to the filter and return system when the return switch is open. The return switch is closed when the power switch is in an off position and the return switch is open when the power switch is in an on position. Thus, the return switch means ensures that power is not being applied to the heating mechanism before completion of the filtering procedure.

BRIEF DESCRIPTION OF THE DRAWINGS

The above description and other objects, advantages and features of the present invention will be more fully understood and appreciated by reference to the specification and accompanying drawings, wherein.

DETAILED DESCRIPTION OF THE PREFERRED EMBODIMENTS

Figure 1:
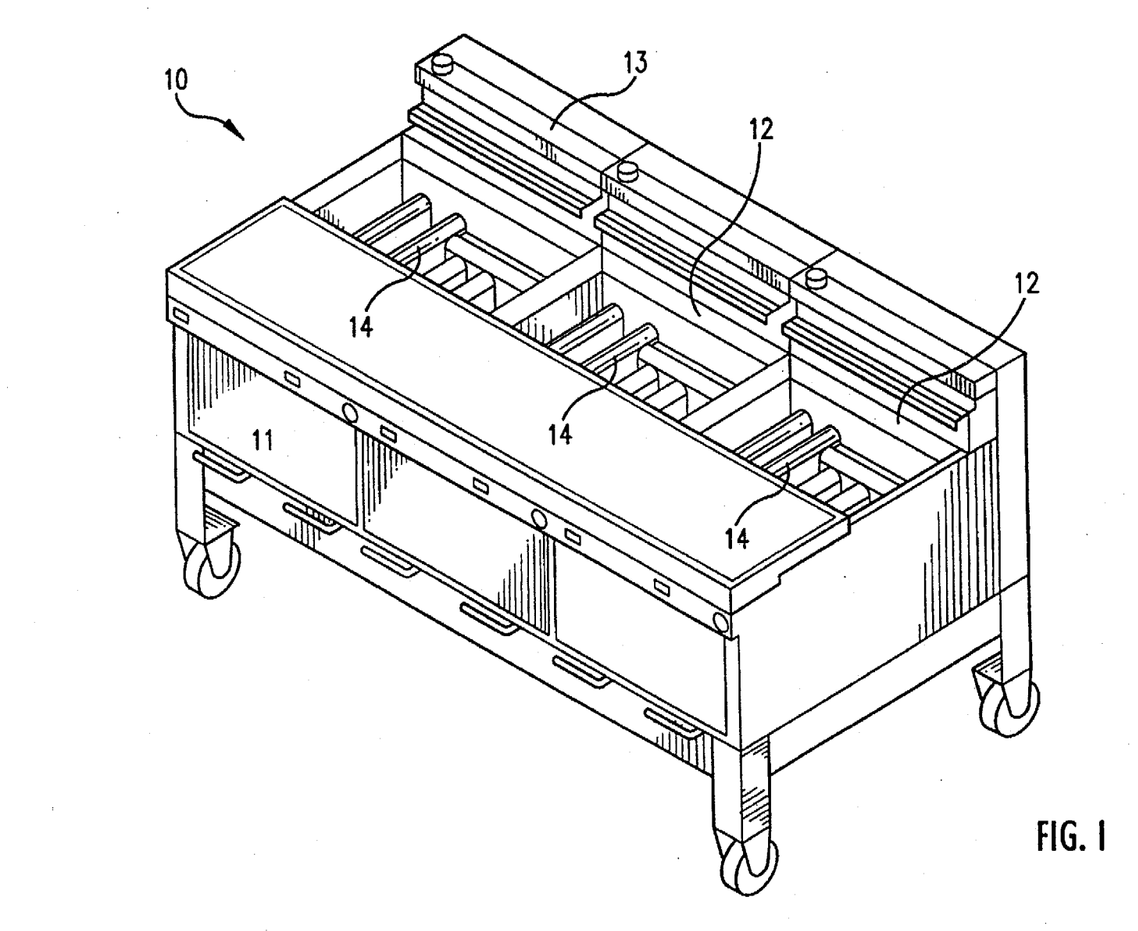
FIG. 1 is a perspective view of a heat exchanger positioned in a gas flyer vat according to the present invention.
Figure 2:
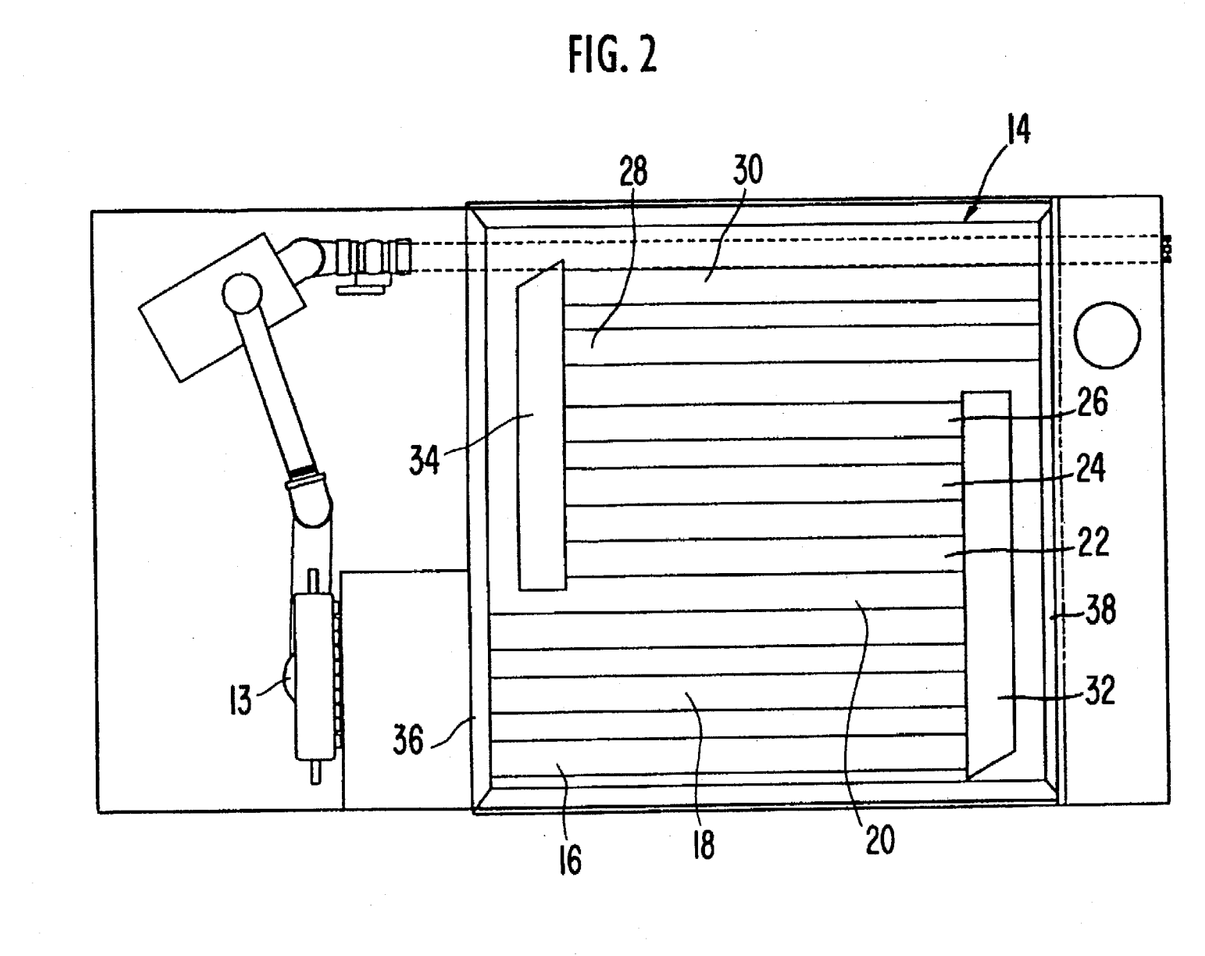
FIG. 2 is a top plan schematic thereof.

Referring to FIG. 1, a gas fryer according to the present invention is shown generally by reference numeral 10. The gas fryer preferably includes a plurality of vats 12 for holding the shortening, oil, or other cooking medium, a heat exchanger 14 for heating the shortening in each vat 12, a burner 11 for heating the fluid flowing through the heat exchanger, and a blower motor 13 for drawing or forcing the heated fluid through the heat exchanger 14. Due to its efficiency and economic availability, the heat exchange fluid generally used in the present invention and in prior art gas fryers is air; however, other gaseous fluids or liquids may of course also be considered as the development thereof permits. In the preferred embodiment of FIGS. 1–4, heat exchanger 14 includes a plurality of heat transfer conduits or tubes 16, 18, 20, 22, 24, 26, 28, 30 and two mixing plenums 32, 34. The direction of travel of the heated fluid through heat exchanger 14 is schematically illustrated in FIG. 2 to show the heated fluid entering the vat through inlet heat transfer tubes 16, 18, 20, mixing in plenum 32, passing through heat transfer tubes 22, 24, 26, mixing in plenum 34, and then exiting the vat through outlet heat transfer tubes 28, 30. A further description of the heat exchanger is provided in the above noted U.S. Pat. No. 5,417,202, the entire contents of which are hereby incorporated by reference.

In a preferred embodiment of the present invention, gas fryer 10 includes a vat 12 having internal dimensions of 20"×20", 18"×18", or 14"×14", although any other desired dimensions could also be used. Heat exchanger 14 is therefore correspondingly sized to be disposed within vat 12. For example, for a 20" vat, heat transfer tubes 16, 18, 20, 28, 30 are approximately 16.9" long and heat transfer tubes 22, 24, 26 are approximately 13.9" long. Plenum 32 is disposed approximately 1.0" from sidewall 38 and plenum 34 is disposed approximately 1.0" from sidewall 36. The center lines of heat transfer tubes 16, 30 are disposed approximately 1.5" inwards from opposing sidewalls of vat 12, and the center lines of the remaining heat transfer tubes are disposed approximately 2.125" from one another or, in the case of tubes 22 and 24, positioned 2.125" from the center line of drain 40. Similarly, for an 18" vat, heat transfer tubes 16, 18, 20, 28, 30 are approximately 14.9" long and heat transfer tubes 22, 24, 26 are approximately 11.9" long. As in the 20" vat embodiment, plenum 32 is disposed approximately 1.0" from sidewall 38 and plenum 34 is disposed approximately 1.0" from sidewall 36. The center lines of heat transfer tubes 16, 30 are also disposed approximately 1.5" inwards from opposing sidewalls of vat 12, and the center lines of the remaining heat transfer tubes are disposed approximately 2.125" from one another.

In a further embodiment of the invention, the heat exchanger is used in a vat having inner dimensions of 14"×14". The heat exchanger is therefore correspondingly sized to be disposed within the smaller vat. The dimensions of the heat transfer tubes are also reduced to accommodate the smaller vat dimensions. For example, the heat transfer tubes are approximately 10.9" long and approximately 7.9" long. One plenum is disposed approximately 1.0" from the sidewall and one plenum is disposed approximately 1.0" from the other sidewall. The center lines of the heat transfer tubes are disposed approximately 1.6" inwards from opposing sidewalls of the vat, and the center lines of the remaining heat transfer tubes are disposed approximately 2.125" from one another. Preferably, the heat exchanger and vat are manufactured from stainless steel or any other desired material capable of withstanding significant heat. Stainless steel is preferably used because it does not react chemically with the food or shortening. It also does not flake, or provide foreign matter that could attach to the food, and it withstands harsh cleaning. Stainless steel can be shaped, welded, and ground to avoid food traps while providing optimum heat transfer geometry. Other special coatings and processes may allow other metals or substrates to acquire these properties and be amenable to the shapes required for flow, containment and cooking, but no other materials are currently in common use to achieve these results.

For the above-described embodiments of the present invention, heat exchanger 14 is positioned above the bottom surface of the vat by approximately 3" to 5". This placement of the heat exchanger within vat 12 creates a "cold zone", i.e., the temperature of the shortening below the surface of the heat exchanger (approximately 200° F.) is significantly less than the temperature of the hot shortening above the heat exchanger (approximately 350° F.). This construction prevents food particles that fall into the shortening from sitting on the bottom of the vat and continuing to cook, thereby increasing the useful life of the shortening, oil or other cooking medium within the vat.

Figure 3:
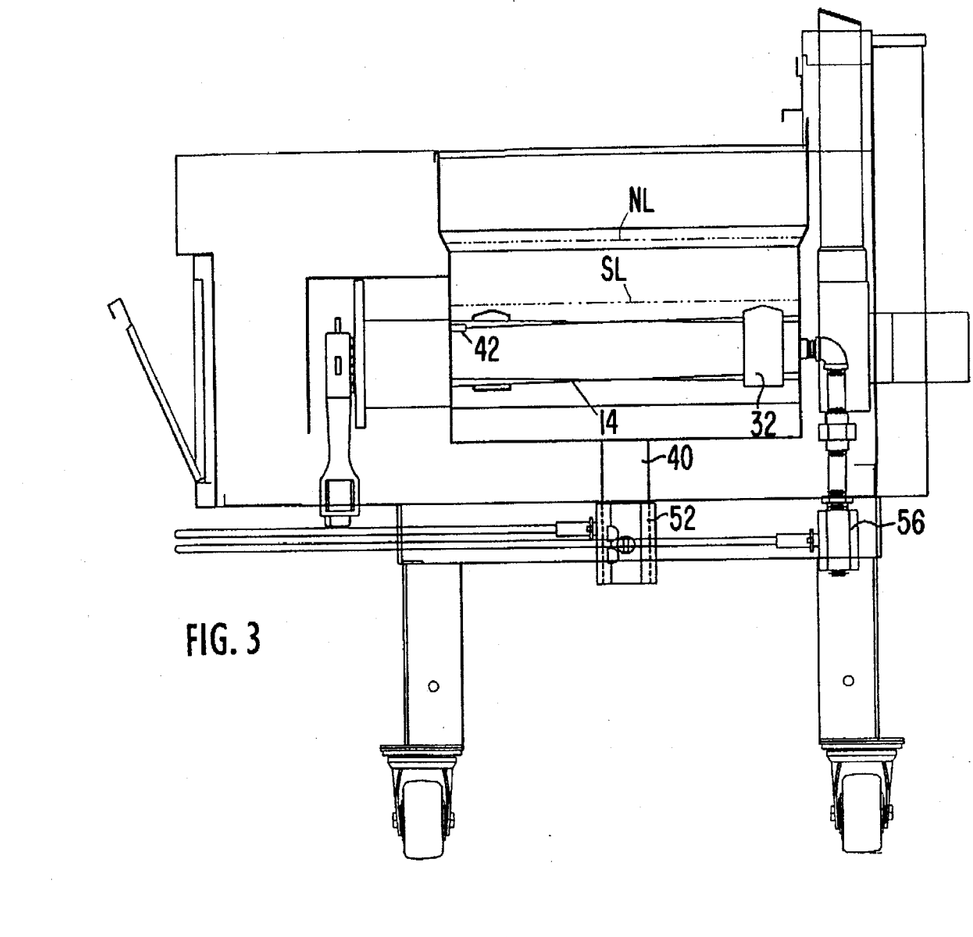
FIG. 3 is a side elevational schematic thereof.
Figure 4:
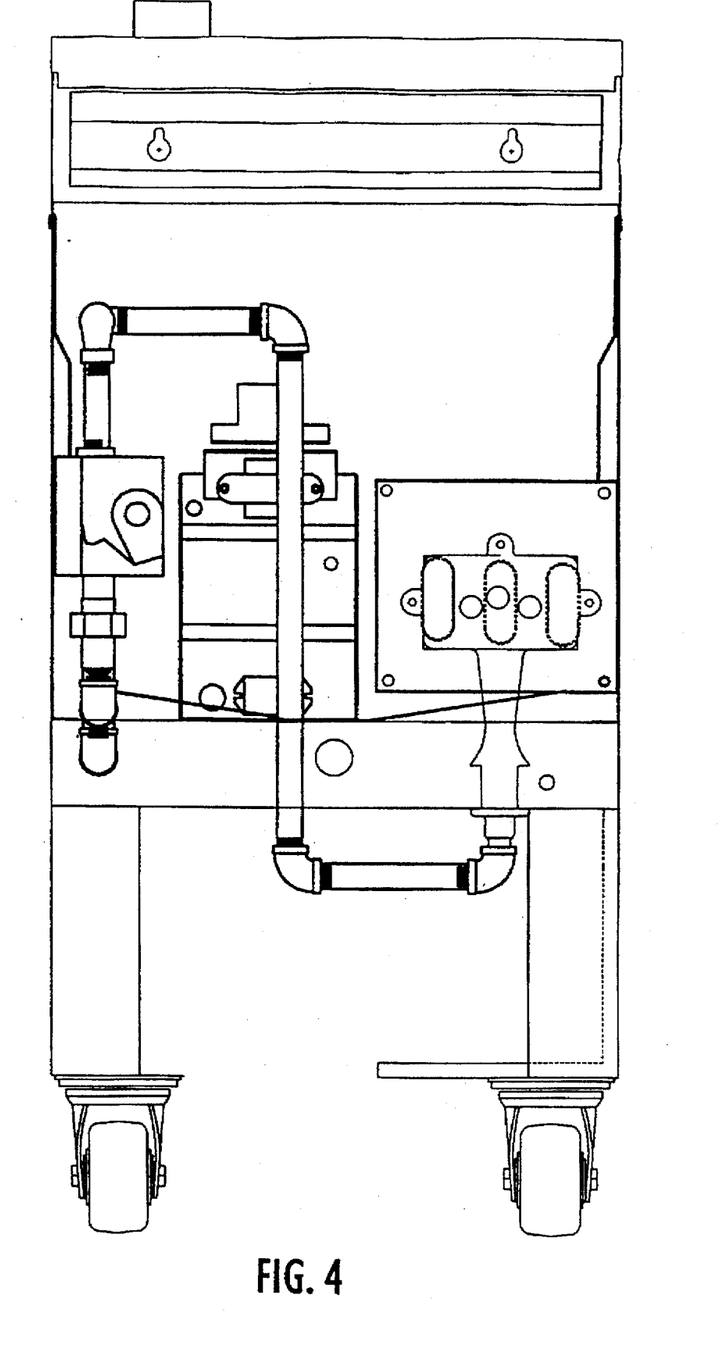
FIG. 4 is an end elevational schematic thereof.

With reference to FIG. 3, a probe 42 is preferably disposed within the vat 12 below the "safe" shortening level represented by line SL. Probe 42 includes a sensor that determines when the melted shortening has reached a predefined temperature. The preferred sensor may be a thermocouple, thermistor or resistance temperature detector (RTD) device. Alternatively, in a less preferred embodiment, a bulb and capillary sensor which only reacts to one temperature could be used for cooking and a melt cycle device that had no sensor could be used for melting, thereby relying on a totally visual decision for exiting from the melt mode with the switching being accomplished by a latching relay. Other devices having properties that change in known ways with temperature may also be used to sense for exit melt enablement and cooking control. In a preferred embodiment, the predefined temperature is approximately 135° F., corresponding to a temperature that will indicate the presence of a heated melted shortening rather than merely ambient air and thereby allow one to exit the melt mode. The melt cycle by nature takes longer to warm up the shortening. A higher predefined temperature would mean longer startup times for reaching the cooking mode. A lower predefined temperature, on the other hand, may not ensure that the shortening has reached the viscosity needed for suitable heat transfer through shortening flow. After reaching the predefined temperature and exiting the melt mode, warm-up time is faster through full-on heating of the exchanger. Generally, probe 42 is placed below line SL so as not to interfere with grills and baskets that rest atop the heat exchanger 14. Due to the preferred placement of a probe below the highest point of the heat exchanger, when a probe was used with prior art fryers it was not an infallible mechanism for determining the safety of the melt mode operation. That is, melted shortening having a temperature greater than the predefined value could exist at the level of the probe without the melted shortening covering the entire heat exchanger. Thus, by automatically switching out of the melt mode in response to a signal from a probe, the heat exchanger tubes could overheat and cause the shortening to catch fire, thereby destroying the fryer vat and heat exchanger. To prevent this from occurring in the present invention, an additional manual operation is required by the user to positively check the vat to see if the heat exchanger is covered with melted shortening, and if it is, to activate a switch to exit the melt mode of the fryer.

Figure 9:
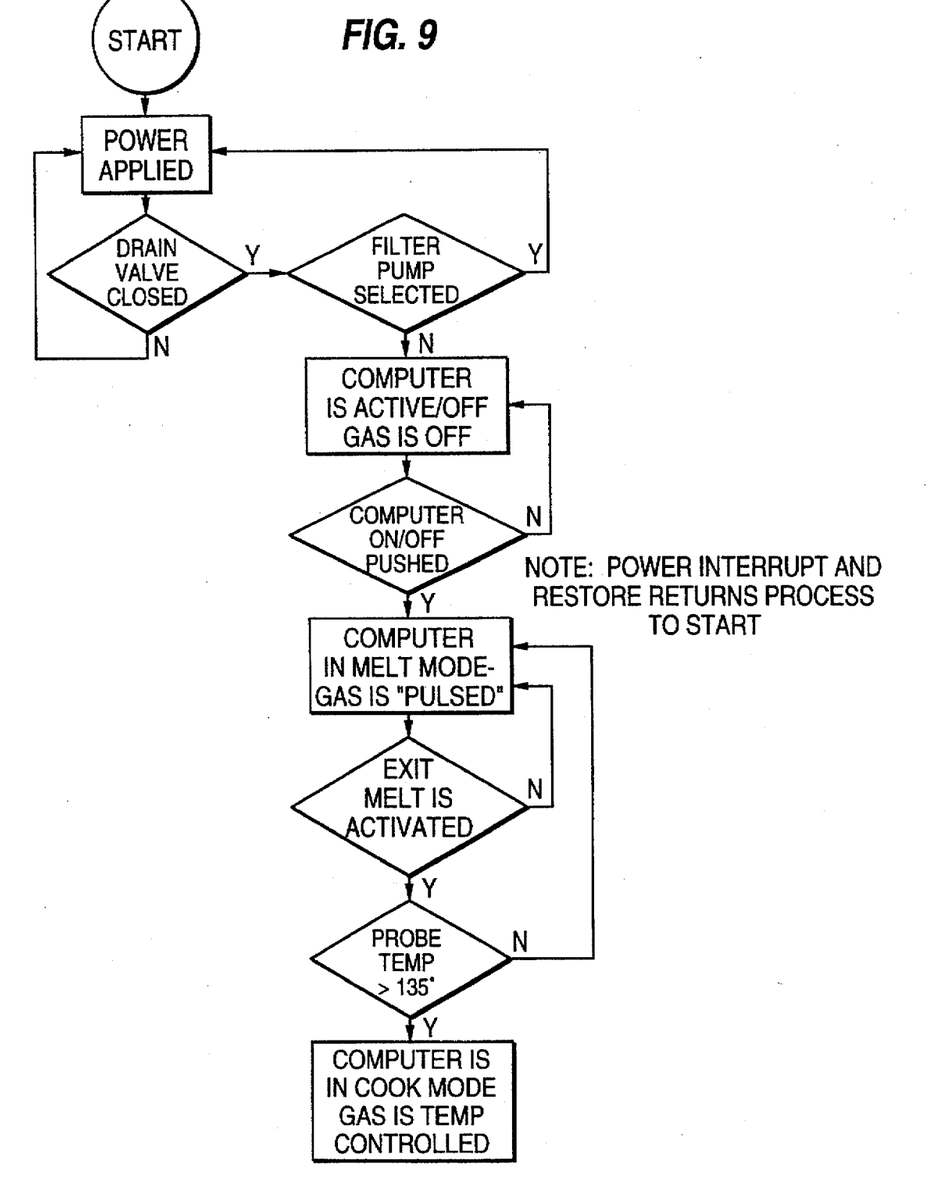
FIG. 9 is a flow chart diagram according to a third embodiment of the present invention.
Figure 10:
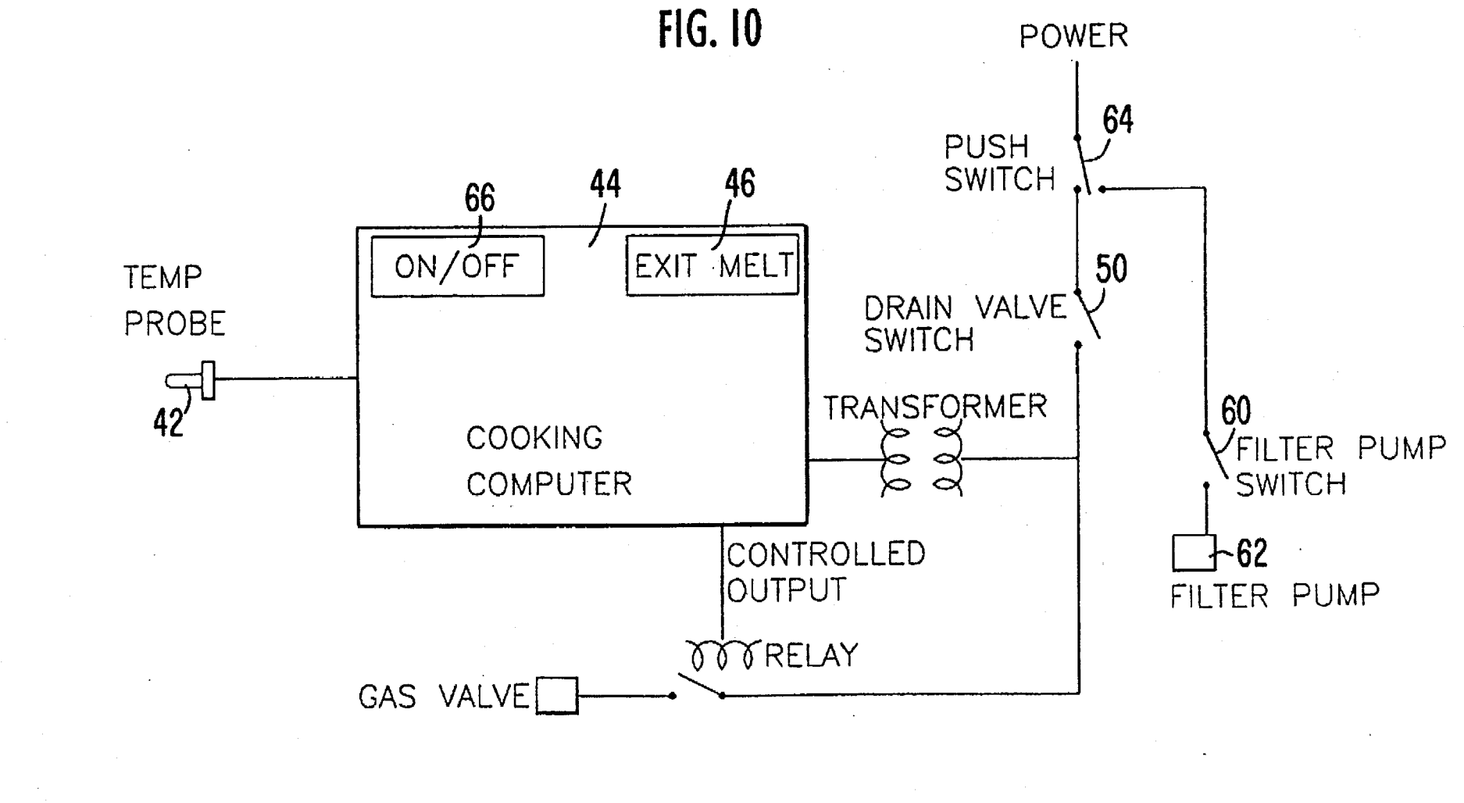
FIG. 10 is an electrical schematic thereof.

Referring to FIGS. 9 and 10, in a first preferred embodiment of the present invention, a cooking computer 44 is used to ensure that the heating system begins in the melt mode whenever power is initially supplied to the system. That is, whenever power is disrupted or otherwise disconnected, a push switch or selector switch 64 must first be actuated to connect power to the system and ON/OFF switch 66 must then be actuated to return cooking computer 44 to operation. Whenever cooking computer begins operation, it is going to begin in the safe-melt mode of operation. The safe-melt mode of the present invention is a pulsed on-off duty cycle where gas is delivered to the burner in predetermined intervals. Typically, the gas will be on for approximately eight seconds and then turn off for twenty-eight seconds, before turning on once again. By using this pulsed cycle for initially heating the solid shortening, the shortening gradually melts, but without overheating the vat or heat exchanger. During the safe-melt mode of the present invention, the temperature of the heat exchanger may slowly rise to a steady-state temperature not exceeding approximately 500° F. This temperature is below the flashpoint of shortening (typically 550° F.) and is well below temperatures damaging to stainless steel (typically 1,000+° F.), i.e., the thermal fatigue value of the heat exchanger. These design considerations are chosen when an animal or vegetable derivative is the preferred solid shortening to be melted and stainless steel is the material being utilized for manufacture of the heat exchanger and vat; however, it should be clear to one skilled in the art that if peanut oil, Olestra® or other solid shortenings were to be used having varying flashpoints or if other metals or materials are used for construction of the fryer, the maximum heated temperature of the heat exchanger tubes would vary accordingly.

When the probe 42 senses that the melted shortening has reached the predefined temperature in the present invention, a signal may be made to the user of the fryer. This signal may be audible, such as a tone, or visible such as a light on a control panel of cooking computer 44. In any event, the heating system remains in the safe-melt mode even after the probe senses the predefined temperature. In order for the fryer to be operated in a cook mode, where the gas is turned on continuously, the user must manually actuate an exit melt switch 46. Alternatively, the computer may display the actual temperature of the melted shortening and this display may be periodically monitored so that the user is aware of the actual temperature and can determine the proper time to actuate the exit melt switch 46. Before doing so, however, the user is expected to visually inspect the level of the melted shortening within the vat and determine whether or not it has reached the safe shortening level, noted by line SL. If the melted shortening has not reached line SL, and is thus not substantially covering the entire heat exchanger, then the system should continue operation in the safe-melt mode until the melted shortening does completely cover the heat exchanger. On the other hand, if at the time the probe signals or the display indicates that the shortening has reached the predefined temperature, the user inspects the shortening level within the vat and is confident that the shortening is substantially coveting the entire heat exchanger, then he may manually actuate switch 46 such that the heating system exits the safe-melt mode and thereafter operates in a full heat cook mode. To further protect the vat and heat exchanger from overheating, the computer 44 is programmed such that it will not allow the user to prematurely exit the safe-melt mode before the temperature sensed by the probe is greater than the predefined value.

In a preferred embodiment of the present invention, a drain valve switch 50 is added to ensure that the drain of the flyer vat is closed and melted shortening is present within the vat before the fryer is allowed to operate in a full heat cook mode. The drain valve is opened routinely during the filtering process of the shortening, i.e., the shortening is drained from the vat through the drain valve, cycled through a filter pump, and then returned to the vat through a return generally necessary to remove generally necessary to remove particles of food that may have collected on the bottom of the vat. However, the user of the fryer may not always remember to close the drain valve after the filtering process is complete. Similiarly, the drain valve may be opened accidentally during cleaning or other activities. In the prior art embodiments, once the shortening drained below the safe level represented by line SL, fire and other major damage would occur to the vat and the heat exchanger if the fryer was operated in the full heat cook mode.

Referring also to FIGS. 11–14, drain valve switch 50 is used to ensure that if the vat's drain valve 52 is opened (allowing shortening to leave the vat and thus again exposing the heat exchanger to a dry-firing possibility), the main power is disconnected to the cooking computer 44 and the heating system shuts down. When power is thereafter applied, with the drain valve closed, cooking computer 44 will be in an "off" state and the ON/OFF switch 66 must be activated by the user to resume operation. The only available choice to the user is to re-enter the safe-melt mode. As discussed above in detail, cooking computer 44 will continue to operate in the safe-melt mode until exit melt switch 46 is manually activated. Accordingly, whether the drain is accidentally left open after filtering or whether it is mistakenly opened during operation of the fryer, the end result is that the power to the fryer will be disconnected so as to avoid damage to the vat and heat exchanger. Moreover, when power is again restored, and the ON/OFF switch activated, the power-off fail safe ensures that the system will begin operation in the safe-melt mode to avoid any damage to the vat or heat exchanger in the event that the level of shortening has decreased below the safe shortening level while the drain was open.

Figure 11:
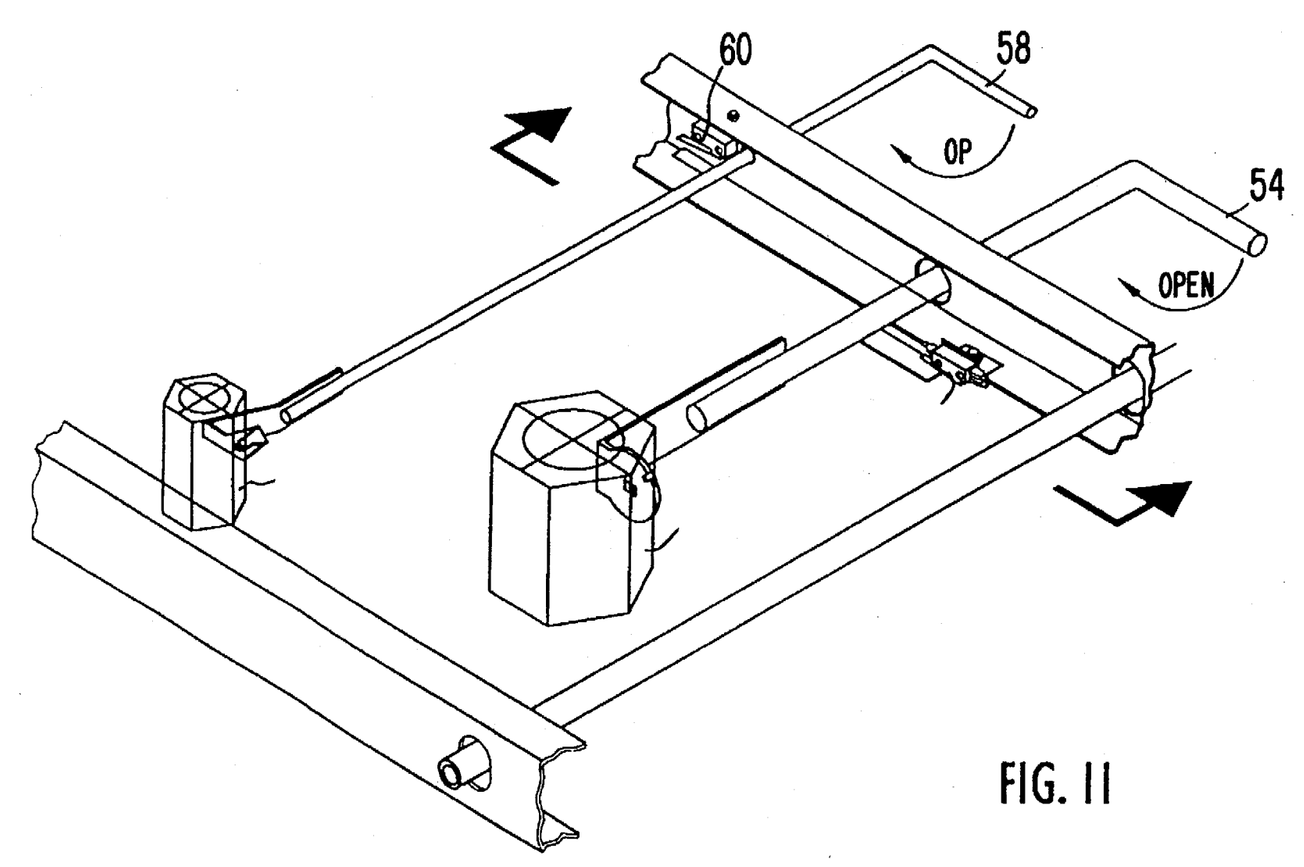
FIG. 11 is a top plan schematic of the drain system according to the present invention.
Figure 12:
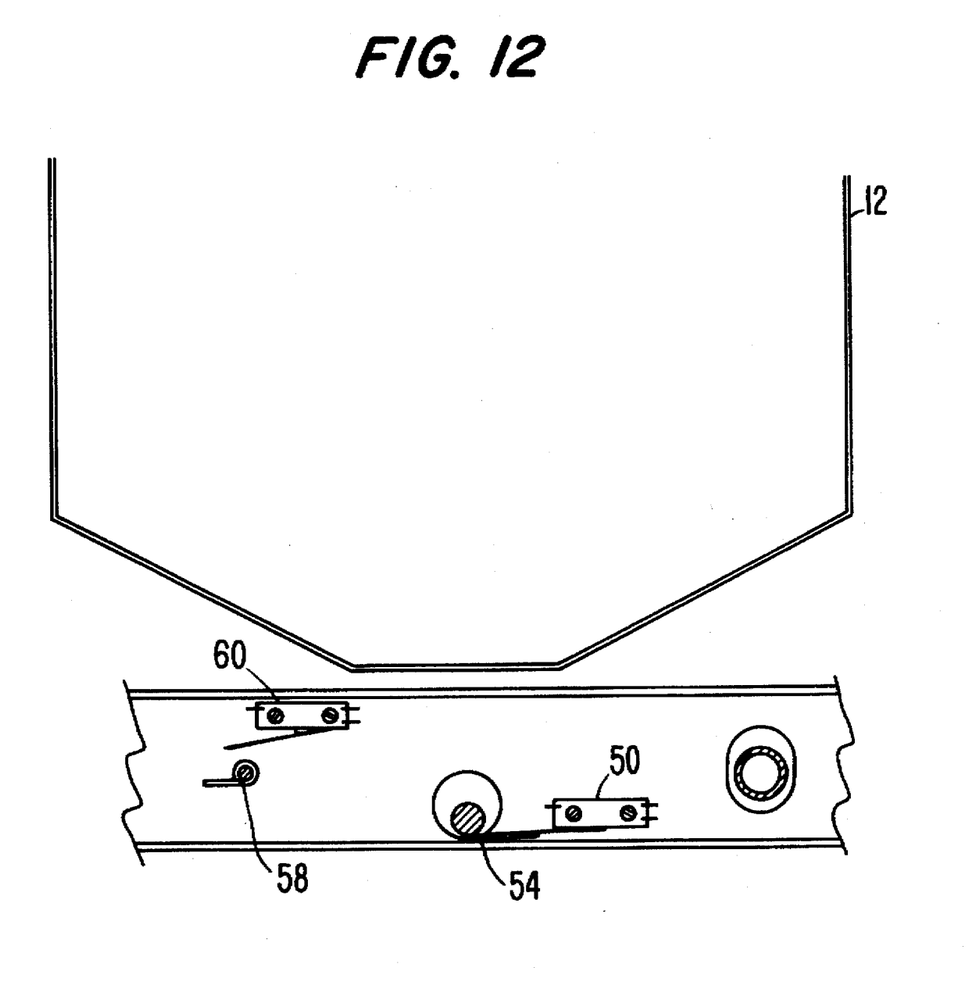
FIG. 12 is a partial cross-sectional view illustrating the positioning of the handles and microswitches during a normal operating mode.

As shown in FIG. 11, the present invention includes a drain valve 52 having a drain valve handle 54, a drain valve switch 50, a return valve 56 having a return valve handle 58 and a switch 60 for the filter pump. FIG. 12 illustrates the position of these elements during the normal operating cook mode of the fryer. As shown, return handle 58 is in a closed position, switch 60 is open, drain handle 54 is in a closed position, and drain valve switch 50 is in a closed position. With reference to FIG. 10, the closed position of switch 50 allows power to be supplied to the cooking computer for operation of the heating cycle. The open position of switch 60 indicates that power is not being supplied to the filter pump 62 during the normal operating cook mode.

Figure 13:
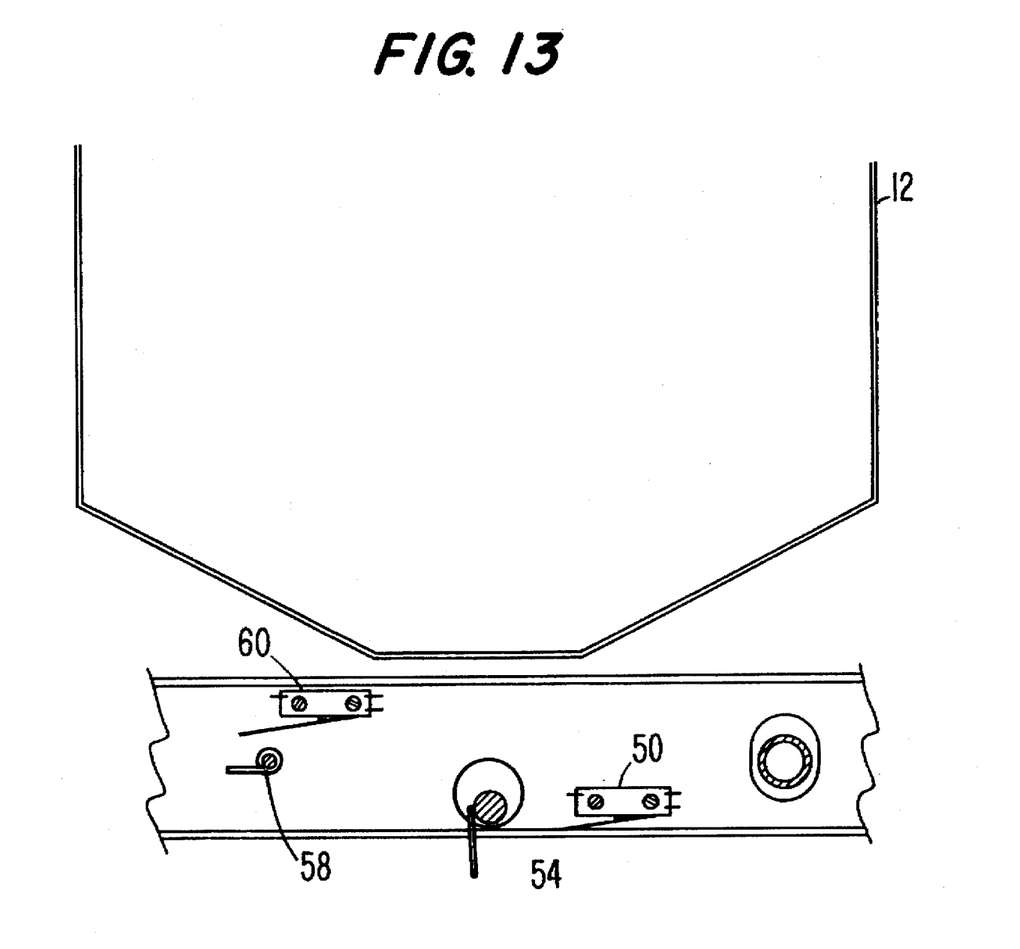
FIG. 13 is a partial cross-sectional view illustrating the positioning of the handles and microswitches during a drain mode.

Similarly, FIG. 13 illustrates the positions of the handles and switches during the drain mode of operation. As shown, return handle 58 is in a closed position, switch 60 is open, drain handle 54 is in an open position, and drain valve switch 50 is in an open position. Thus, with the drain in an open position, power is not supplied to the cooking computer and the danger of the vat and heat exchanger being damaged is eliminated. Prior to refilling the vat, the system may be allowed to cycle the shortening through the filtering operation several times in a process known as polishing the shortening. Thus, the system may operate with the drain handle 54 is an open position and switch 60 in a closed position.

Figure 14:
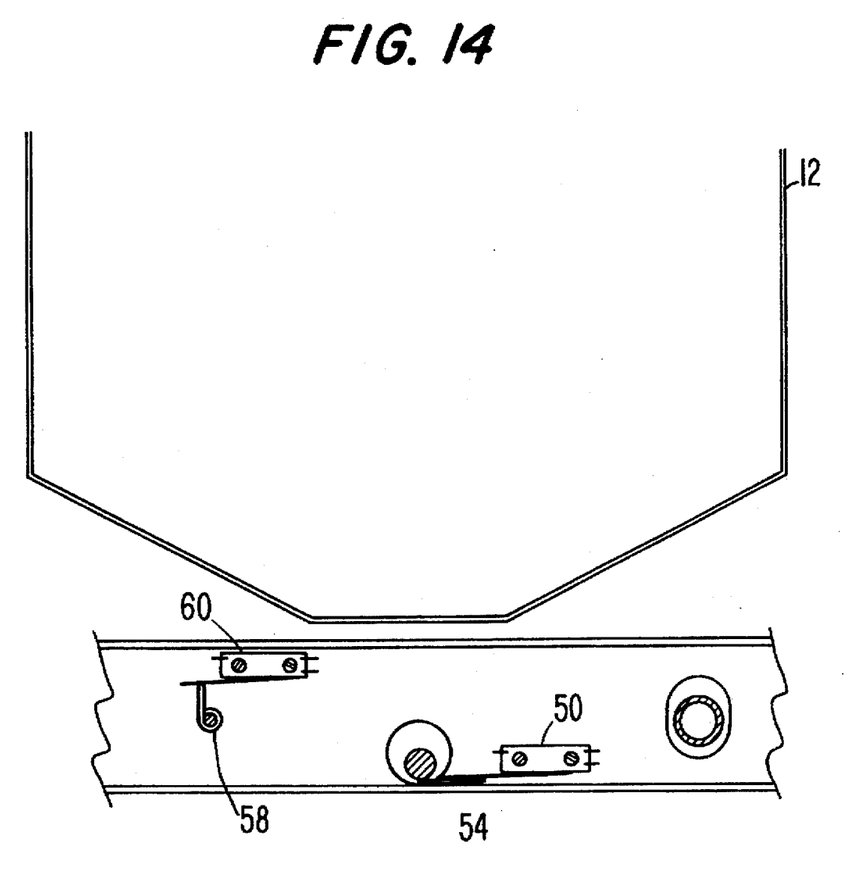
FIG. 14 is a partial cross-sectional view illustrating the positioning of the handles and microswitches during a vat fill mode.

With reference to FIG. 14, after the vat is drained and the shortening has been processed through filter pump 62, it is then returned to the vat through return valve 56. Accordingly, in the vat fill mode, when the shortening is being returned to the vat, the return handle 58 is in an open position, the switch 60 is closed, the drain handle 54 is in a closed position, and the drain valve switch 50 is closed. The vat fill mode thereby allows power to be supplied to the filter pump for the filtering operation (by virtue of the closed switch 60). Power is only supplied to the filter pump, however, when the selector switch 64 is in the "off" position. Thus, power to the computer 44 and the fryer must be disconnected in order for the shortening to be filtered and returned to the vat. When the filtering operation is completed and push switch or selector switch 64 is activated to the "on" position, power is then supplied to cooking computer 44 (by virtue of closed switch 50), which will begin operation in the melt mode when the ON/OFF switch 66 is again activated to the ON position.

Figure 5:
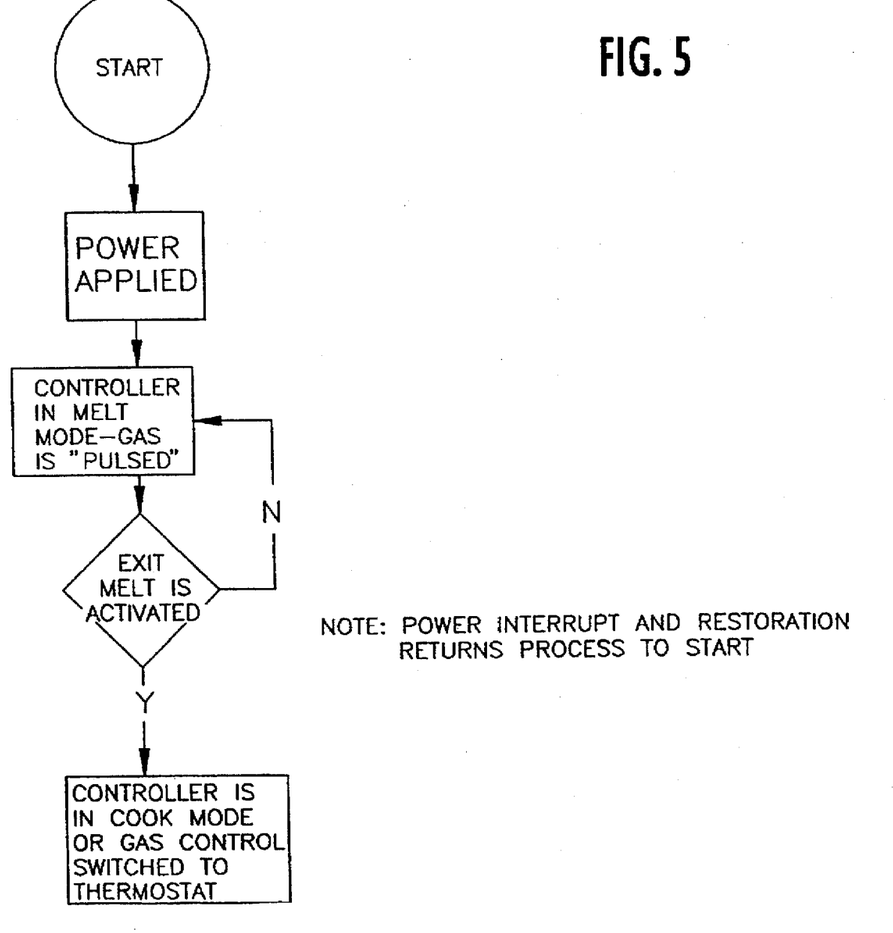
FIG. 5 is a flow chart diagram according to a first embodiment of the present invention.
Figure 6:
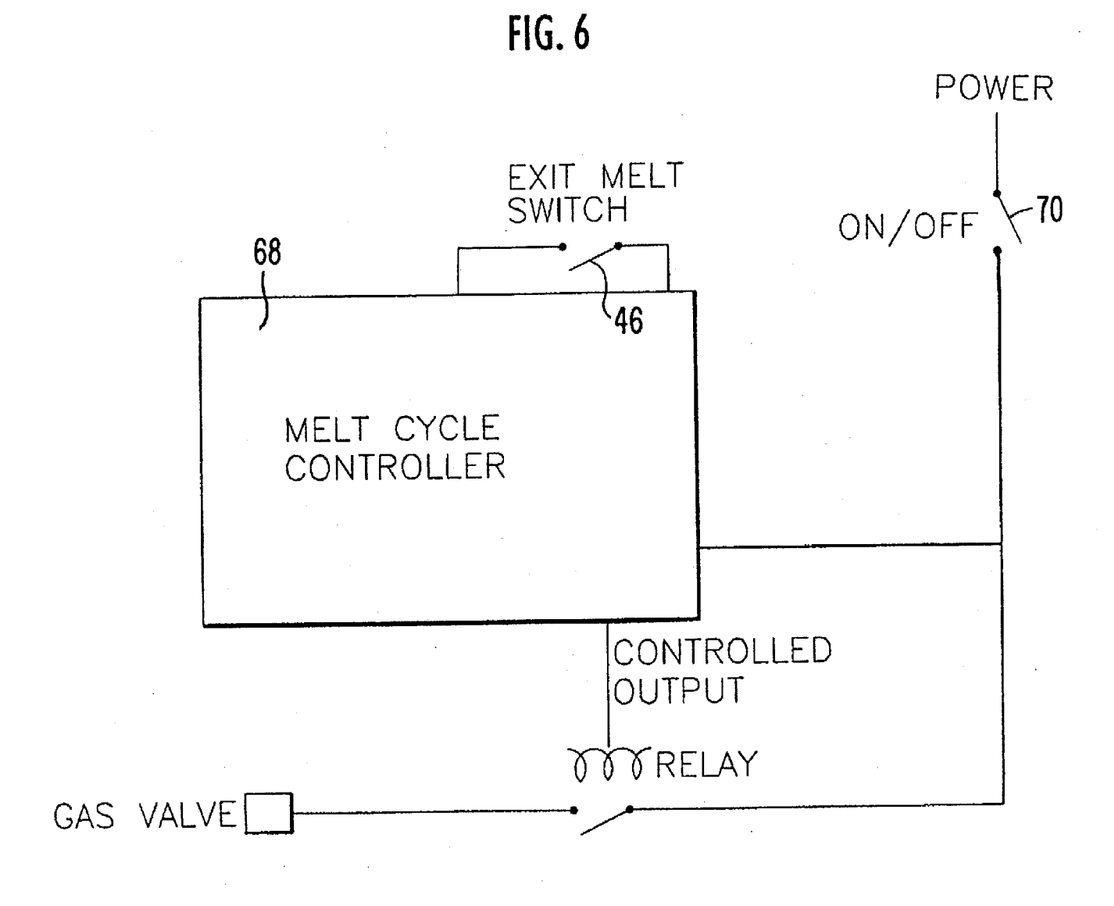
FIG. 6 is an electrical schematic thereof.

Referring to FIGS. 5 and 6, a simplified embodiment of that described above includes a melt cycle controller 68 rather than the computer 44 of the first embodiment. The melt cycle controller 68 is wired to a main power switch 70 such that switch 70 must be activated in order for controller 68 to operate. Further, controller 68 will automatically enter a safe-melt mode, as described above, any time power is initially supplied after being turned off or otherwise disrupted. As with the above embodiment, controller 68 will also not exit the safe-melt mode of operation until the exit melt switch 46 is manually actuated by the user. Thus, controller 68 also prevents damage to the vat and heat exchanger by requiring the additional manual actuation of the exit melt switch in order for the fryer to operate in a full heat cook mode.

Figure 7:
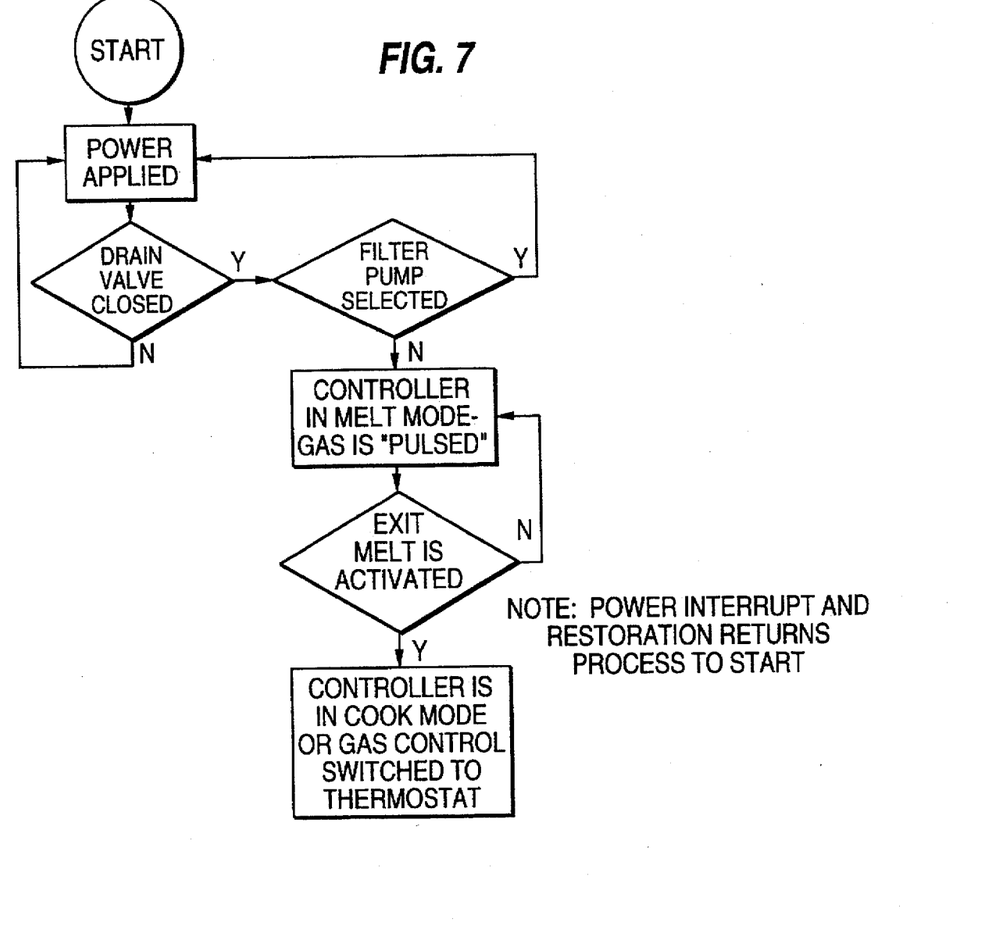
FIG. 7 is a flow chart diagram according to a second embodiment of the present invention.
Figure 8:
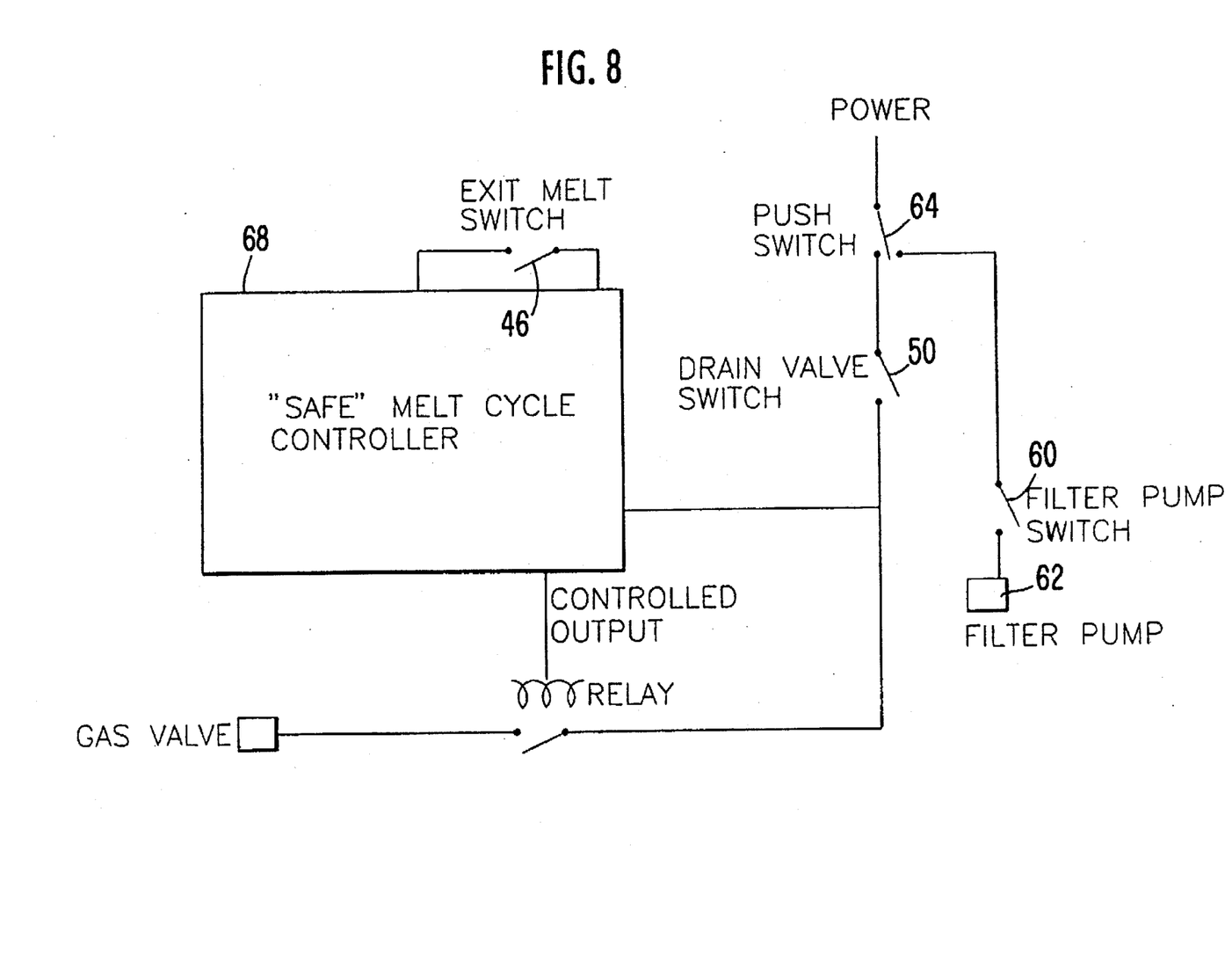
FIG. 8 is an electrical schematic thereof.

FIGS. 7 and 8 illustrate a further modification of the second embodiment described above, by the addition of drain valve switch 50 and switch 60 for the filter pump. Drain valve switch 50 and switch 60 operate identically as described above with reference to the first preferred embodiment. Accordingly, in this embodiment, controller 68 is prevented from operating and receiving power when drain valve 52 is open, i.e., drain valve switch 50 is open. Likewise, filter pump 62 only receives power to operate when push or selector switch 64 is in the off position, and when power is restored to controller 68 (by virtue of closed drain valve switch 50), controller 68 will begin operation in the safe-melt mode. Thus, damage to the vat and heat exchanger is prevented by requiring that drain valve 56 be closed such that drain valve switch 50 must be closed, and by requiring controller 68 to operate in the safe-melt mode of operation until the user manually actuates the exit melt switch 46.

Although described above with reference to particular embodiments, it will be obvious to one of ordinary skill in the art that many modifications of the various embodiments are possible. That is, just as the controller may be used with or without the drain valve switch and/or return valve switch, the cooking computer may also be used with or without the drain valve switch and/or the return valve switch. Further, it will be obvious to one of ordinary skill in the art that numerous modifications may be made without departing from the true spirit and scope of the present invention, which is to be limited only by the appended claims.

I claim:

1. A fryer system comprising:

a fryer including a vat for containing shortening therein;

a heat exchanger disposed within said vat;

heating means for supplying heat to said heat exchanger;

control means for controlling said heating means, said control means repeatedly cycling said heating means between an off condition and an on condition during a melt mode of operation and maintaining said heating means in an on condition during a cook mode of operation;

manual switch means for switching said control means from the melt mode of operation to the cook mode of operation;

prevention means for preventing said control means from entering the cook mode of operation, and thereby maintaining said heating means in an on condition, prior to actuation of said manual switch means.

2. The fryer system of claim 1 wherein said vat contains a selected amount of shortening, the shortening within said vat in a substantially melted state being at least sufficient to substantially cover said heat exchanger and thereby define a safe level of shortening.

3. The fryer system of claim 2 wherein said manual switch means is actuated after the shortening has melted sufficiently to reach said safe level.

4. The fryer system of claim 1 wherein said prevention means further requires said control means to operate in the melt mode whenever power is initially supplied thereto following a power interruption.

5. The fryer system of claim 4 further comprising power switch means having an on position and an off position for turning power on and off, respectively, to said control means.

6. The fryer system of claim 5 further comprising drain switch means for applying power to said control means when said drain switch means is closed and interrupting power to said control means when said drain switch means is open, said drain switch means being closed when a drain valve of said vat is closed and open when the drain valve of said vat is open, said drain switch means thereby ensuring that the drain valve of said vat is closed before applying power to said control means.

7. The fryer system of claim 5 further comprising return switch means for applying power to a filter and return system when said return switch means is closed and interrupting power to the filter and return system when said return switch means is open, said return switch means being closed when said power switch means is in an off position and said return switch means being open when said power switch means is in an on position, said return switch means thereby ensuring that power is not applied to said control means before applying power to the filter and return system.

8. The flyer system of claim 5 wherein said control means further includes sensor means for sensing the temperature of the melted shortening within said vat and creating a signal when the temperature sensed reaches a predefined value.

9. The flyer system of claim 8 wherein said manual switch means may only be actuated after said sensor means reaches said predefined value.

10. The flyer system of claim 9 wherein said control means further includes an on/off switch, said control means beginning operation in said melt mode each time said on/off switch is activated to the on condition.

11. A method of operating a heating system for a flyer comprising the steps of:

placing a quantity of shortening within a fryer vat;

applying power to the flyer system by actuating a main power switch;

applying power to a control means for the heating system, the control means initializing operation of the heating system in a melt mode;

observing the level of the shortening within the vat; and actuating a manual exit melt switch when the observed level of the shortening is sufficient to substantially cover a heat exchanger disposed within the flyer vat;

wherein the control means switching operation to a cook mode in response to actuation of the manual exit melt switch.

12. The method of claim 11 wherein said step of placing shortening within the fryer vat includes placing a solid shortening with the flyer vat and said step of observing the level of shortening includes observing the level of shortening that has melted as a result of the melt mode operation of the heating system.

* * * * *